United States Patent
Srivastava et al.

(10) Patent No.: US 9,123,525 B2
(45) Date of Patent: Sep. 1, 2015

(54) PHOSPHOR MATERIALS, FLUORESCENT LAMPS PROVIDED THEREWITH, AND METHODS THEREFOR

(71) Applicant: General Electric Company, Schenectady, NY (US)

(72) Inventors: Alok Mani Srivastava, Niskayuna, NY (US); Holly Ann Comanzo, Niskayuna, NY (US); William Winder Beers, Chesterland, OH (US); Samuel Joseph Camardello, Albany, NY (US); Digamber Gurudas Porob, Bangalore (IN); William Erwin Cohen, Solon, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 20 days.

(21) Appl. No.: 14/138,306

(22) Filed: Dec. 23, 2013

(65) Prior Publication Data

US 2015/0179423 A1    Jun. 25, 2015

(51) Int. Cl.
*H01J 1/62* (2006.01)
*H01J 63/04* (2006.01)
(Continued)

(52) U.S. Cl.
CPC .............. *H01J 61/44* (2013.01); *C09K 11/025* (2013.01); *C09K 11/778* (2013.01); *H01J 9/22* (2013.01); *H01J 61/46* (2013.01)

(58) Field of Classification Search
CPC ............ H01J 61/44; H01J 9/22; H01J 61/46; C09K 11/025; C09K 11/778; C09K 11/76; C09K 11/71; C09K 11/73; C09K 11/7783; C09K 11/7785–11/7787

USPC ............... 252/301.4 R, 301.4 P; 445/58; 313/486–487

See application file for complete search history.

(56) References Cited

U.S. PATENT DOCUMENTS 5,776,368 A     7/1998   Chau
2011/0311823 A1  12/2011  Porob et al.
(Continued)

FOREIGN PATENT DOCUMENTS

DE   102012203419 A1   1/2013
EP       0390194 A1   10/1990
(Continued)

OTHER PUBLICATIONS

EP Search Report and Written Opinion from EP Application No. 14198260.3 dated May 6, 2015.
(Continued)

*Primary Examiner* — Anne Hines
*Assistant Examiner* — Jose M Diaz
(74) *Attorney, Agent, or Firm* — GE Global Patent Operation; Peter T. DiMauro

(57) ABSTRACT

Phosphor particles, methods for their use to produce fluorescent lamps, and fluorescent lamps that make use of such particles. Such a phosphor particle has a core surrounded by a shell, and the shell contains $GdMgB_5O_{10}$ doped (activated) with at least terbium ions as a rare earth-containing phosphor composition that absorbs ultraviolet photons to emit green-spectrum light. The core is formed of a mineral material that is chemically compatible with the rare earth-containing phosphor composition of the shell, but does not contain intentional additions of terbium.

20 Claims, 1 Drawing Sheet

(51) Int. Cl.
*H01J 61/44* (2006.01)
*H01J 61/46* (2006.01)
*H01J 9/22* (2006.01)
*C09K 11/77* (2006.01)
*C09K 11/02* (2006.01)

(56) References Cited

U.S. PATENT DOCUMENTS

2013/0195979 A1* 8/2013 Tersigni ................. 424/490
2014/0191652 A1 7/2014 Hirrle et al.

FOREIGN PATENT DOCUMENTS

EP 2565254 A1 3/2013
WO 2008106312 A1 9/2008

OTHER PUBLICATIONS

Ding et al: "Luminescence and excitation spectra of Ce3+-Tb3+ions co-doped in the LnMgB5O10 system", Journal of the Less-Common Metals, Elsevier-Sequoia S.A. Lausanne, CH, vol. 148, No. 1-2, Apr. 1989, pp. 393-397.

Lin, C. K. et al: "Photoluminescent properties of sol-gel derived (La,Gd) MgB5O10:Ce3+/Tb3+nanocrystalline thin films", Optical Materials, Elsevier Science Publishers B.V. Amsterdam, NL, vol. 28, No. 8-9, Jun. 2006, pp. 913-918.

* cited by examiner

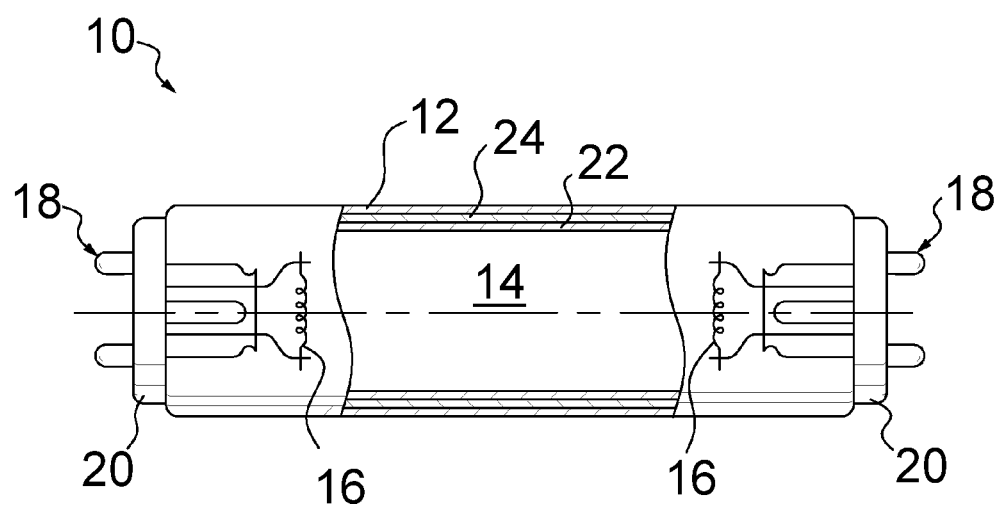

US 9,123,525 B2

PHOSPHOR MATERIALS, FLUORESCENT LAMPS PROVIDED THEREWITH, AND METHODS THEREFOR

BACKGROUND OF THE INVENTION

The present invention generally relates to phosphor materials. More particularly, this invention relates to phosphor materials that are capable of use in fluorescent lamps and contain lower levels of one or more constituents, for example, the rare earth elements of rare earth phosphors.

Phosphors exhibit luminescence and are commonly used in fluorescent lamps, light emitting diodes (LEDs), and various other applications. Phosphor compositions typically comprise a host material doped with an activator that prolongs the emission time. A wide variety of phosphor compositions are known, including rare earth compounds and transition metal compounds doped with one or more rare earth activators.

Fluorescent lamps typically comprise a glass tube that serves as a transparent glass envelope enclosing a sealed discharge space that contains an inert gas and mercury vapor. The inner surface of the glass tube is coated with a layer containing a phosphor composition that is separated from the tube by an ultraviolet (UV) reflecting barrier layer of, for example, alumina or a halophosphor. The mercury vapor is ionized through the application of a current to produce radiation having primarily ultraviolet (UV) wavelengths, which in turn is absorbed by the phosphor composition, resulting in excitation of the phosphor composition to produce visible light that is emitted through the glass tube.

The spectral composition of a light source is typically gauged by its color rendering index (CRI), which is a measure of the degree to which the psycho-physical colors of objects illuminated by a light source conform to those of a reference illuminant under specified conditions. The color-rendering properties and emission output of fluorescent lamps can be improved through the use of phosphor layers containing a mixture of red, green and blue-emitting phosphors, which in combination produce illumination of that appears to be white. As a non-limiting example, phosphor layers have been employed that contain a controlled mixture of europium-activated barium magnesium aluminate phosphor ($BaMgAl_{10}O_{17}:Eu^{2+}$; BAM) as a blue-emitting phosphor, cerium- and terbium-coactivated lanthanum phosphate phosphor ($LaPO_4:Ce^{3+},Tb^{3+}$; LAP) as a green-emitting phosphor, and europium-activated yttrium oxide phosphor ($Y_2O_3:Eu^{3+}$; YOE) as a red-emitting phosphor, mixed in appropriate ratios. As known in the art, the term "activated" refers to the effect that doping with europium, cerium, terbium, and other dopants have with respect to the luminescence of a phosphor.

Terbium is currently used in all high-performance green phosphors, for example, $(La,Ce,Tb)PO_4:Ce^{3+},Tb^{3+}$ (LAP), $(Ce,Tb)MgAl_{11}O_{19}:Ce^{3+},Tb^{3+}$ (CAT), and $GdMgB_5O_{10}:Ce^{3+},Tb^{3+}$ (CBT). However, rare earth elements, and particularly terbium and europium, are relatively expensive metals and their prices impact the cost of phosphor compositions. As such, terbium currently is a significant impact on the cost of green phosphor compositions, and it would be desirable to minimize the cost impact that terbium and potentially other rare earth metals have on green phosphors and lighting systems that employ them.

BRIEF DESCRIPTION OF THE INVENTION

The present invention provides phosphor particles, methods for their use to produce fluorescent lamps, and fluorescent lamps that make use of such particles.

According to a first aspect of the invention, a phosphor particle comprises a core surrounded by a shell, and the shell contains $GdMgB_5O_{10}$ doped (activated) with at least Tb ions as a rare earth-containing phosphor composition that absorbs ultraviolet photons to emit green-spectrum light. The core is formed of a mineral material that is chemically compatible with the rare earth-containing phosphor composition of the shell, but does not contain intentional additions of terbium.

According to a second aspect of the invention, a fluorescent lamp comprises a glass envelope that encloses a discharge space, and a phosphor material on an inner surface of the glass envelope. The phosphor material comprises phosphor particles, and at least some of the phosphor particles comprise a core surrounded by a shell. The shell contains $GdMgB_5O_{10}$ doped with at least Tb ions as a rare earth-containing phosphor composition that absorbs ultraviolet photons to emit green-spectrum light. The core is formed of a mineral material that is chemically compatible with the rare earth-containing phosphor composition of the shell, but does not contain intentional additions of terbium.

Another aspect of the invention is a method of fabricating a fluorescent lamp. The method includes forming phosphor particles each comprising a core surrounded by a shell. The shell contains GdMgB5O10 doped with at least Tb ions as a rare earth-containing phosphor composition that absorbs ultraviolet photons to emit green-spectrum light. The core is formed of a mineral material that is chemically compatible with the rare earth-containing phosphor composition of the shell, but does not contain intentional additions of terbium. The phosphor particles are then deposited on an inner surface of a glass envelope.

A technical effect of the invention is the ability to use less terbium in a green phosphor material made up of particles by limiting the terbium content of the material to an outer shell of the particles, such that an interior core of the particles is formed by a mineral material that does not contain any intentional additions of terbium.

Other aspects and advantages of this invention will be better appreciated from the following detailed description.

BRIEF DESCRIPTION OF THE DRAWINGS

FIG. 1 represents a fluorescent lamp, a fragmentary cross-sectional view of a glass tube of the lamp, and an inner surface of the tube provided with a layer containing a phosphor material.

DETAILED DESCRIPTION OF THE INVENTION

FIG. 1 schematically represents a fluorescent lamp 10 of a type known in the art. The lamp 10 includes an elongate glass envelope 12, for example, formed of a soda-lime silicate glass, that in combination with a pair of bases 20 defines, encloses and seals a discharge space 14 of the lamp 10. The discharge space 14 contains a gas mixture having at least one constituent that can be ionized to generate radiation that includes ultraviolet (UV) wavelengths. According to the current state of the art, such a gas mixture would include a discharge-sustaining fill, typically one or more inert gases (for example, argon) or a mixture of one or more inert gases and other gases at a low pressure, along with a small quantity of mercury vapor. A spaced pair of electrodes 16 are electrically connected to electrical contacts 18 extending from the bases 20 at opposite ends of the glass envelope 12. A phosphor material is present at an inner surface of the glass envelope 12 to define a phosphor layer 22 facing the discharge space 14 of the lamp 10. As known in the art, application of a suitable current to the electrodes 16 results in ionization of the mercury vapor and the generation of radiation having primarily UV wavelengths. Photons of the UV radiation are absorbed by the phosphor composition of the phosphor layer 22, resulting in excitation of the phosphor composition to produce visible light that is emitted through the glass envelope 12.

In the nonlimiting embodiment represented in FIG. 1, a barrier layer 24 is represented as being between the phosphor layer 22 and the inner surface of the glass envelope 12. The barrier layer 24 can contain a phosphor material, for example, a conventional calcium halophosphate phosphor, and/or a UV-reflecting material of a type known in the art, for example, a mixture of alpha- and gamma-alumina particles. The inclusion of alternative or additional layers is also foreseeable and within the scope of the invention.

According to a preferred aspect of the invention, the phosphor layer 22 is formed with the use of particles, of which at least some contain a terbium-activated (doped) phosphor composition, preferably $GdMgB_5O_{10}$ doped with at least terbium ions ($GdMgB_5O_{10}$:Tb) and more preferably $GdMgB_5O_{10}$ doped with at least cerium and terbium ions ($GdMgB_5O_{10}$:Ce,Tb), which are collectively referred to as CBT (cerium, borate, terbium) phosphors. Suitable cerium and terbium doping techniques and levels for $GdMgB_5O_{10}$ are known in the art and therefore will not be discussed in any detail here. CBT phosphor compositions absorb ultraviolet photons (254 nm wavelength) to emit green-spectrum light. To produce with the lamp 10 what visually appears as light of other colors, the phosphor layer 22 preferably contains particles of at least one doped $GdMgB_5O_{10}$ phosphor composition as well as particles of other phosphor compositions. As a particular but nonlimiting example, the phosphor layer 22 may further contain a blue-emitting phosphor such as europium-activated barium magnesium aluminate phosphor ($BaMgAl_{10}O_{17}$:$Eu^{2+}$; BAM) and a red-emitting phosphor such as europium-activated yttrium oxide phosphor ($Y_2O_3$:$Eu^{3+}$; YOE). The green-, blue- and red-emitting phosphors can be present in appropriate ratios within the phosphor layer 22 to generate what would be considered as white light. Other potential red-emitting phosphor that could be used in combination with Tb-doped $GdMgB_5O_{10}$ phosphor compositions used in the invention include, but are not limited to, europium-activated yttrium vanadate-phosphate ($Y(P,V)O_4$:Eu) and cerium- and manganese-coactivated gadolinium (CBM). Other potential blue-emitting phosphor compositions that could be used in combination with Tb-doped $GdMgB_5O_{10}$ phosphor compositions used in the invention include, but are not limited to, europium-doped halophosphate (SECA) and europium-doped barium magnesium aluminate (BAM).

According to a preferred aspect of the invention, particles of the terbium-activated phosphor composition used in the phosphor layer 22 are not entirely formed of Tb-doped $GdMgB_5O_{10}$. Instead, the particles comprise a core surrounded by a shell, and the Tb-doped $GdMgB_5O_{10}$ phosphor composition is preferentially located in the shell. The shell may consist entirely of a Tb-doped $GdMgB_5O_{10}$ phosphor composition, though it is foreseeable that the Tb-doped $GdMgB_5O_{10}$ phosphor composition could be one of multiple constituents of the shell. The core may be formed of one or more mineral materials that are chemically compatible with the Tb-doped $GdMgB_5O_{10}$ phosphor composition of the shell, but does not contain any intentional additions of terbium and preferably does not contain any terbium beyond any potential impurity levels.

In use within, for example, the lamp 10 of FIG. 1, only a thin surface portion of each particle of the terbium-activated phosphor composition is sufficiently excited to generate light. As such, terbium ions located deep within a particle would not generate light since they are not efficiently excited. Consequently, terbium ions are preferably present in the particles to a depth roughly corresponding to the thin surface portion (shell) that can be excited by the UV wavelengths generated by the lamp 10, with the core constituting the balance of each particle, such that the terbium content of a particle is drastically lower in comparison to a particle formed entirely of the same Tb-doped $GdMgB_5O_{10}$ phosphor composition present in the shell.

To minimize the cost of the terbium-activated phosphor composition, the core can be formed of one or more relatively inexpensive compositions. Notable but nonlimiting examples include $LaPO_4$, $Al_2O_3$, $Y_2O_3$, and $Gd_2O_3$. Each of these compounds are notable for being chemically compatible (e.g., nonreactive) and physically compatible (e.g., sufficiently similar CTEs) with the Tb-doped $GdMgB_5O_{10}$ phosphor compositions present within the shell. These core materials are also compatible with processes capable of forming a Tb-containing shell on the core surface.

Synthesis processes for forming particles comprising Tb-containing shells on Tb-free cores can be completed in various ways. For examples, the particles could be produced by combining in a reactor the doped $GdMgB_5O_{10}$ phosphor composition and the Tb-free material of the shells and cores, respectively. Alternatively, preformed cores could be utilized around which the Tb-containing shell forms through contact with the doped $GdMgB_5O_{10}$ phosphor composition. A third approach is to utilize preformed cores and a precursor of the doped $GdMgB_5O_{10}$ phosphor composition, from which the desired Tb-containing shells deposit and form around the cores.

The phosphor layer 22 containing the terbium-activated phosphor composition particles described above can be formed by various known procedures, including but not limited to deposition from liquid coatings and electrostatic deposition. As such, the manner of coating deposition is not a limiting factor of the invention. As particular but nonlimiting examples, the phosphor material can be deposited on the inner surface of the glass envelope 12 from an otherwise conventional aqueous coating solution that contains various organic binders, adhesion-promoting agents, and non-luminescent additives including alumina, calcium phosphate, thickeners, dispersing agents, surfactants, and certain borate compounds.

In a coating process that combines the green-emitting terbium-activated phosphor composition particles with red- and/or blue-emitting particles, powders of the chosen particles can be blended by weight and then dispersed in an aqueous coating solution, optionally along with any desired additives such as of the types noted above. The resulting dispersion may be diluted with deionized water until suitable for producing a uniform coating based on a targeted coating thickness or weight. The dispersion can then be applied to the inner surface of the glass envelope, for example, by pouring the dispersion downward into the glass envelope or pumping the dispersion upward into the glass envelope while the envelope is held vertically. The resulting coating may be heated and dried by forced air, after which this process can be repeated any number of times to build up a total or cumulative coating thickness that is sufficient to absorb substantially all of the UV light produced by the lamp. Nonlimiting examples include thicknesses for the phosphor layer 22 of about three to about seven particles thick, corresponding to a thickness of about 3 and about 50 micrometers, more preferably about 10 and 30 micrometers, depending on the compositions and particle sizes of the phosphors.

While the invention has been described in terms of specific embodiments, it is apparent that other forms could be adopted by one skilled in the art. For example, the teachings of the present invention could be applied to a variety of fluorescent lamps, including compact fluorescent lamps (CFLs). Therefore, the scope of the invention is to be limited only by the following claims.

The invention claimed is:

1. A phosphor particle comprising a core surrounded by a shell, the shell containing $GdMgB_5O_{10}$ doped with at least Tb ions as a rare earth-containing phosphor composition that absorbs ultraviolet photons to emit green-spectrum light, the core being formed of a mineral material that is chemically compatible with the rare earth-containing phosphor composition of the shell, and the core does not contain intentional additions of terbium.

2. The phosphor particle according to claim 1, wherein the core does not contain terbium.

3. The phosphor particle according to claim 1, wherein the rare earth-containing phosphor composition is $GdMgB_5O_{10}$:$Ce^{3+}$,$Tb^{3+}$.

4. The phosphor particle according to claim 1, wherein the shell consists of $GdMgB_5O_{10}$ doped with at least Tb ions.

5. The phosphor particle according to claim 1, wherein the shell consists of $GdMgB_5O_{10}$:$Ce^{3+}$,$Tb^{3+}$.

6. The phosphor particle according to claim 1, wherein the mineral material of the core is at least one compound chosen from the group consisting of $LaPO_4$, $Al_2O_3$, $Y_2O_3$, and $Gd_2O_3$.

7. The phosphor particle according to claim 1, wherein the core is entirely encased within the shell.

8. The phosphor particle according to claim 1, wherein the particle is a constituent of a layer on a surface of a glass tube of a fluorescent lamp.

9. A fluorescent lamp comprising:
a glass envelope enclosing a discharge space and having an inner surface; and
a phosphor material on the inner surface of the glass envelope, the phosphor material comprising phosphor particles, at least some of the phosphor particles comprising a core surrounded by a shell, the shell containing $GdMgB_5O_{10}$ doped with at least Tb ions as a rare earth-containing phosphor composition that absorbs ultraviolet photons to emit green-spectrum light, the core being formed of a mineral material that is chemically compatible with the rare earth-containing phosphor composition of the shell, and the core does not contain intentional additions of terbium.

10. The fluorescent lamp according to claim 9, wherein the core does not contain terbium.

11. The fluorescent lamp according to claim 9, wherein the rare earth-containing phosphor composition is $GdMgB_5O_{10}$:$Ce^{3+}$,$Tb^{3+}$.

12. The fluorescent lamp according to claim 9, wherein the shell consists of $GdMgB_5O_{10}$ doped with at least Tb ions.

13. The fluorescent lamp according to claim 9, wherein the shell consists of $GdMgB_5O_{10}$:$Ce^{3+}$,$Tb^{3+}$.

14. The fluorescent lamp according to claim 9, wherein the mineral material of the core is at least one compound chosen from the group consisting of $LaPO_4$, $Al_2O_3$, $Y_2O_3$, and $Gd_2O_3$.

15. The fluorescent lamp according to claim 9, wherein the core is entirely encased within the shell.

16. The fluorescent lamp according to claim 9, wherein the phosphor material is present on the inner surface of the glass envelope is a single-layer coating.

17. A method of fabricating a fluorescent lamp, the method comprising:
forming phosphor particles each comprising a core surrounded by a shell, the shell containing $GdMgB_5O_{10}$ doped with at least Tb ions as a rare earth-containing phosphor composition that absorbs ultraviolet photons to emit green-spectrum light, the core being formed of a mineral material that is chemically compatible with the rare earth-containing phosphor composition of the shell, and the core does not contain intentional additions of terbium; and
depositing the phosphor particles on an inner surface of a glass envelope.

18. The method according to claim 17, wherein the rare earth-containing phosphor composition is $GdMgB_5O_{10}$:$Ce^{3+}$,$Tb^{3+}$.

19. The method according to claim 17, wherein the shell consists of $GdMgB_5O_{10}$ doped with at least Tb ions.

20. The method according to claim 17, wherein the mineral material of the core is at least one compound chosen from the group consisting of $LaPO_4$, $Al_2O_3$, $Y_2O_3$, and $Gd_2O_3$.

* * * * *